UNITED STATES PATENT OFFICE.

ANDREW J. TUCKER, OF SEDALIA, MISSOURI.

WATERPROOFING AND PRESERVING COMPOSITION.

1,020,857.  Specification of Letters Patent.  Patented Mar. 19, 1912.

No Drawing.  Application filed April 15, 1910.  Serial No. 555,563.

*To all whom it may concern:*

Be it known that I, ANDREW J. TUCKER, a citizen of the United States, residing at Sedalia, in the county of Pettis and State of Missouri, have invented certain new and useful Improvements in Waterproofing and Preserving Compositions; and I do hereby declare the following to be a full, clear, and exact description of the invention, such as will enable others skilled in the art to which it appertains to make and use the same.

This invention relates to an improved composition for water-proofing, indurating, and preserving stone, artificial stone, as cement blocks, bricks, and the like, as well as wood or any porous material.

The invention also comprises the method of applying the composition to any desired article and the finished article after the same has had the composition applied thereto.

The composition is designed to saturate any article for water-proofing and preserving the same as above set forth, either with or without changing the color. When it is desired to change the color of any article, the coloring matter is added, and when it is desired to coat the surface of the article a paint is mixed with the composition. The coloring matter is designed to follow the composition and color the article throughout, while the paint does not follow the composition, but remains as a coat on the surface. The components of the composition are Japan wax, ceresin, sulfate of iron, crude petroleum, and Japanese wood oil.

In preparing the compound the same is mixed as follows: Take 15 parts of sulfate of iron, 20 parts of ceresin, 35 parts of Japan wax and 15 parts of crude petroleum and boil together until the iron is fairly dissolved. After this mixture has been boiled until the iron is fairly dissolved add 15 parts of Japanese wood oil, which addition however is to be made after the mixture has been slightly cooled but before it solidifies. The addition of the Japanese wood oil causes the wood when dipped in the composition to take a finish. If desired the petroleum and sulfate of iron may be boiled together a short time, and then the remaining parts added. When this mixture hardens the same congeals and makes a comparatively hard body which when applied must be heated to at least a liquid condition and preferably to a boiling point. It may then be applied by a brush but preferably it is applied by dipping. The method employed in saturating an article, either wood, cement brick or other desired article, is to heat the same until it is approximately the temperature of the boiling composition and then submerge it in the boiling composition. The article is then left any desired time in the composition which is maintained in a boiling condition. The article may be saturated throughout or partially saturated according to the time which it remains in the boiling bath. After the article has been penetrated by the boiling composition to the desired extent it is removed and permitted to cool, after which it may be polished or disposed of as desired. When subjecting wood to this process the same will be in a condition to receive a very high polish and will be hardened at the same time. Also the wood will become more pliable, but without being injured. From this it will be observed that the process causes wood to assume a more pliable nature, hardens the same, and causes the same to take a high polish.

When it is desired to color either wood, artificial stone, or other materials, coloring matter is added. Any color that will combine with oil or color oil may be used with this composition to produce the desired color on cement blocks, wood, or other articles. This variety of coloring matter when mixed with the composition will penetrate the wood or other article at the same time that the wood or other article is penetrated by the composition. When it is desired to coat wood or other material with paint, and at the same time impregnate the same with the composition, any desired paint ground in oil is added to the composition, and then the process is carried on as above set forth. During the employment of the process the composition will penetrate the article but the paint will remain on the outer surface as a coat.

In using the Japan wax the same is designed to fill the pores of the wood, and also harden the same, for causing the wood to take a high polish when wood is being treated by the composition. The ceresin combines with the Japan wax and renders it more penetrating so that both waxes will penetrate to a greater depth any article submerged in the composition. The crude petroleum is used particularly to liquefy the sulfate of iron after the same has been raised to a boiling point and the Japanese wood oil is added after the other parts have been boiled and are slightly cooled for acting as a drier and also as means for hardening the surface and causing the wood to take a finish when being polished.

After the wood has been dipped and saturated in the manner above set forth, the same may then be painted in any desired manner. When dipped and painted at the same time, or dipped and painted afterward, the wood is preserved and is made water-proof so that the wood and the paint applied thereto will last a comparatively long time, no moisture being present in the wood to cause deterioration.

What I claim is:

1. A composition for treating materials comprising Japan wax, sulfate of iron, crude petroleum, and Japanese wood oil.

2. A composition for treating materials comprising Japan wax, ceresin, sulfate of iron, crude petroleum, and Japanese wood oil.

3. A composition for treating material comprising Japan wax, ceresin, sulfate of iron, crude petroleum, Japanese wood oil combined in the proportions specified and united in a homogeneous mass by heating to a boiling point.

In testimony whereof I affix my signature in presence of two witnesses.

ANDREW J. TUCKER.

Witnesses:
JOHN L. FLETCHER,
A. L. KITCHIN.